(12) United States Patent
Kwon et al.

(10) Patent No.: US 9,335,589 B2
(45) Date of Patent: May 10, 2016

(54) DISPLAY APPARATUS AND METHOD OF MANUFACTURING THE SAME

(71) Applicant: Samsung Display Co., Ltd., Yongin, Gyeonggi-Do (KR)

(72) Inventors: Seonggyu Kwon, Suwon-si (KR); Hyung-Il Jeon, Incheon (KR)

(73) Assignee: SAMSUNG DISPLAY CO., LTD. (KR)

( * ) Notice: Subject to any disclaimer, the term of this patent is extended or adjusted under 35 U.S.C. 154(b) by 0 days.

(21) Appl. No.: 14/479,449

(22) Filed: Sep. 8, 2014

(65) Prior Publication Data

US 2015/0198835 A1  Jul. 16, 2015

(30) Foreign Application Priority Data

Jan. 10, 2014 (KR) .................. 10-2014-0003530

(51) Int. Cl.
*G02F 1/1339* (2006.01)
*G02F 1/1341* (2006.01)

(52) U.S. Cl.
CPC .......... *G02F 1/13394* (2013.01); *G02F 1/1339* (2013.01); *G02F 1/1341* (2013.01); *G02F 1/13392* (2013.01); *G02F 2001/13396* (2013.01)

(58) Field of Classification Search
CPC ........... G02F 1/13394; G02F 1/13392; G02F 1/1339; G02F 1/1341; G02F 2001/13396; G02F 2001/13398; G02F 1/133512; G02F 1/133377; G02F 1/133707
USPC ................................. 349/155–157
See application file for complete search history.

(56) References Cited

U.S. PATENT DOCUMENTS

| | | | |
|---|---|---|---|
| 6,705,584 B2 | 3/2004 | Hiroshima et al. | |
| 7,102,722 B2 | 9/2006 | Kim et al. | |
| 7,133,108 B2 * | 11/2006 | Shimizu .............. | G02F 1/13394 349/155 |
| 7,142,277 B2 * | 11/2006 | Choi ................... | G02F 1/13394 349/110 |
| 7,338,556 B2 | 3/2008 | Kim et al. | |
| 7,433,004 B2 | 10/2008 | Tsubata et al. | |
| 7,812,915 B2 | 10/2010 | Kim et al. | |
| 2002/0003526 A1 | 1/2002 | Larson | |
| 2005/0248256 A1 | 11/2005 | Song et al. | |

(Continued)

FOREIGN PATENT DOCUMENTS

| | | |
|---|---|---|
| JP | 2008287062 A | 11/2008 |
| KR | 1020030087696 A | 11/2003 |

(Continued)

OTHER PUBLICATIONS

Roy et al., "Microlens array fabrication by enhanced thermal reflow process: Towards efficient collection of fluorescence light from microarrays", Microelectronic Engineering, 86, 2009, pp. 2255-2261.

Schift et al., "Shape control of polymer reflow structures fabricated by nanoimprint lithography", Microelectronic Engineering, 88, 2011, pp. 87-92.

*Primary Examiner* — Anne Hines
*Assistant Examiner* — Jose M Diaz
(74) *Attorney, Agent, or Firm* — Cantor Colburn LLP

(57) ABSTRACT

A display apparatus includes a first display substrate, a second display substrate which faces the first display substrate and is coupled to the first display substrate, first and second spacers disposed on one of the first and second display substrates, and a transparent electrode disposed between the one of the first and second display substrates and the first spacer.

18 Claims, 13 Drawing Sheets

(56) References Cited

U.S. PATENT DOCUMENTS

| | | | |
|---|---|---|---|
| 2005/0275787 A1* | 12/2005 | Inoue | G02F 1/13394 349/155 |
| 2006/0050222 A1 | 3/2006 | Park | |
| 2006/0125990 A1 | 6/2006 | Lee et al. | |
| 2006/0238694 A1* | 10/2006 | Chen | G02F 1/13394 349/156 |
| 2007/0002263 A1* | 1/2007 | Kim | G02F 1/13394 349/156 |
| 2007/0069204 A1* | 3/2007 | Jang | G02F 1/13394 257/40 |
| 2009/0231522 A1* | 9/2009 | Kim | G02F 1/13394 349/106 |
| 2011/0090445 A1* | 4/2011 | Kim | G02F 1/1339 349/139 |
| 2011/0096279 A1 | 4/2011 | Lee et al. | |
| 2011/0222014 A1 | 9/2011 | Kim et al. | |
| 2012/0055531 A1 | 3/2012 | Ryu et al. | |
| 2012/0081640 A1* | 4/2012 | Kim | G02F 1/133514 349/106 |
| 2015/0159089 A1* | 6/2015 | Kawamura | C09K 19/20 428/1.1 |
| 2015/0185566 A1* | 7/2015 | Choi | G02F 1/134336 349/42 |

FOREIGN PATENT DOCUMENTS

| | | |
|---|---|---|
| KR | 10-0475165 B1 | 2/2005 |
| KR | 1020060132172 A | 12/2006 |
| KR | 10-0685929 B1 | 2/2007 |
| KR | 1020070056471 A | 6/2007 |
| KR | 1020070105457 A | 10/2007 |
| KR | 10-0840328 B1 | 6/2008 |
| KR | 10-0862535 B1 | 10/2008 |

* cited by examiner

DISPLAY APPARATUS AND METHOD OF MANUFACTURING THE SAME

This application claims priority to Korean Patent Application No. 10-2014-0003530, filed on Jan. 10, 2014, and all the benefits accruing therefrom under 35 U.S.C. §119, the contents of which are hereby incorporated by reference in its entirety.

BACKGROUND

1. Field

The invention relates to a display apparatus and a method of manufacturing the same. More particularly, the invention relates to a liquid crystal display ("LCD") apparatus and a method of manufacturing the LCD apparatus.

2. Description of the Related Art

In general, a liquid crystal display ("LCD") includes a thin film transistor ("TFT") substrate, a color filter substrate, and a liquid crystal layer interposed between the TFT substrate and the color filter substrate.

The TFT substrate includes pixels to display an image. Each pixel includes a gate line, a data line, a TFT, and a pixel electrode. The gate line and the data line respectively receive a gate signal and a data signal and are electrically connected to a gate electrode and a source electrode of the TFT, respectively.

The color filter substrate includes a color filter layer, a common electrode, and a spacer. The color filter layer includes red, green, and blue color pixels and the common electrode is disposed on the color filter layer to face the pixel electrode such that the liquid crystal layer is disposed between the common electrode and the pixel electrode. The spacer is disposed on the common electrode and has a predetermined height to secure a space, in which the liquid crystal layer is disposed, between the TFT substrate and the color filter substrate.

The TFT substrate faces the color filter substrate while being coupled to the color filter substrate, and liquid crystals are injected into the space between the TFT substrate and the color filter substrate. Accordingly, the liquid crystal layer is formed between the TFT substrate and the color filter substrate and has a uniform thickness by the spacer.

SUMMARY

The invention provides a display apparatus capable of adjusting a size of spacer suitable for a high resolution display apparatus.

The invention provides a method of manufacturing the display apparatus.

Embodiments of the invention provide a display apparatus including a first display substrate, a second display substrate facing the first display substrate while being coupled to the first display substrate, first and second spacers disposed on one display substrate of the first and second display substrates, and a transparent electrode disposed between the one display substrate and the first spacer.

Embodiments of the invention provide a method of manufacturing a display apparatus, including providing a first display substrate, providing a second display substrate, providing first and second spacers on one display substrate of the first and second display substrates, providing a transparent electrode disposed between the one display substrate and the first spacer, and coupling the first display substrate and the second display substrate such that the first and second spacers are disposed between the first and second display substrates.

According to the above, the two spacers having different sizes may be provided on the display apparatus by allowing the properties of the lower layers under the initial spacer pattern to become different and heat-treating the initial spacer pattern even though a halftone or slit mask process is omitted.

Thus, the halftone or slit mask process may be omitted and the size of the spacers may be precisely controlled. As a result, the spacers suitable for the high resolution display apparatus may be realized.

BRIEF DESCRIPTION OF THE DRAWINGS

The above and other advantages of the invention will become readily apparent by reference to the following detailed description when considered in conjunction with the accompanying drawings, in which.

DETAILED DESCRIPTION

Figure 1:
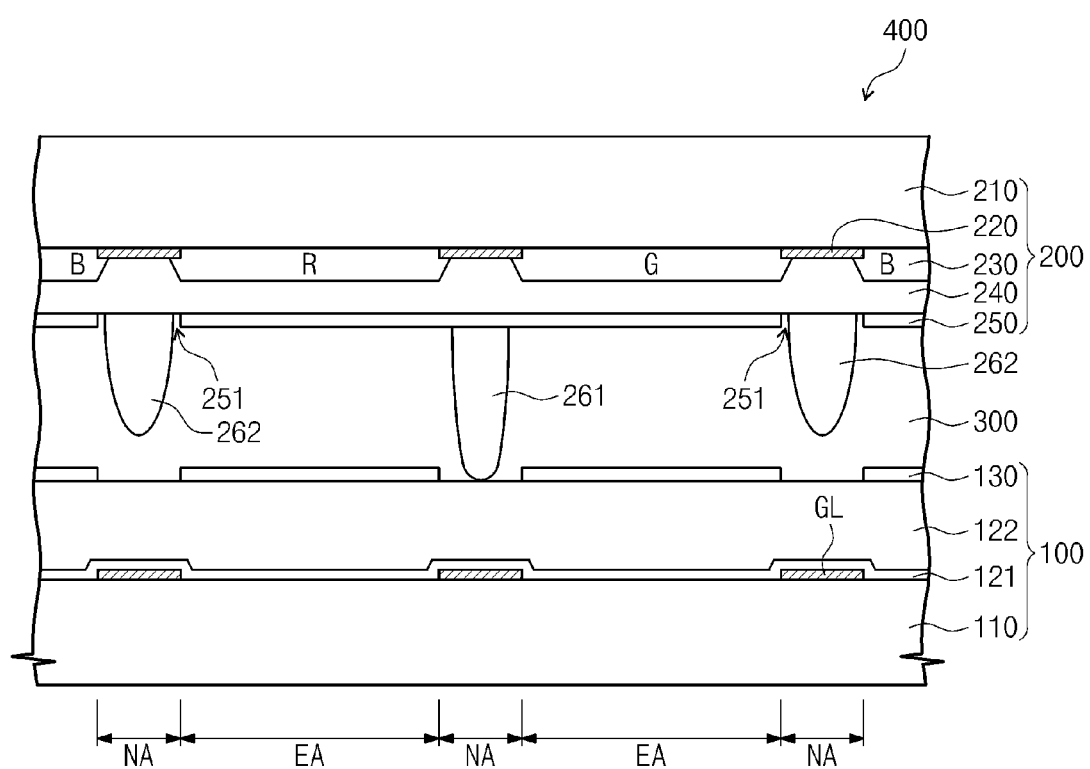
FIG. 1 is a cross-sectional view showing an exemplary embodiment of a liquid crystal display ("LCD") apparatus according to the invention.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. In an exemplary embodiment, when the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention will be explained in detail with reference to the accompanying drawings.

FIG. 1 is a cross-sectional view showing a liquid crystal display ("LCD") apparatus 400 according to an exemplary embodiment of the invention.

Referring to FIG. 1, the LCD apparatus 400 includes a first display substrate 100, a second display substrate 200 facing the first display substrate 100, and a liquid crystal layer 300 interposed between the first display substrate 100 and the second display substrate 200.

The first display substrate 100 includes a first base substrate 110 and a pixel electrode 130.

In an exemplary embodiment, the first base substrate 110 includes a transparent insulating material, such as glass. A gate line GL, a data line, and a thin film transistor ("TFT") (refers to FIG. 8) are disposed on the first base substrate 110. For the convenience of explanation, the data line and the TFT are omitted from FIG. 1.

A gate insulating layer 121 and a protective layer 122 are disposed on the first base substrate 110. The data line and the gate line GL, which extend in perpendicular directions to each other and cross each other, are electrically insulated from each other by the gate insulating layer 121. The protective layer 122 is disposed on the gate insulating layer 121 to cover the TFT and the data line. In exemplary embodiments, the protective layer 122 has a double-layer structure of an inorganic insulating layer and an organic insulating layer, which are sequentially stacked, or a single-layer structure of the inorganic insulating layer or the organic insulating layer.

The pixel electrode 130 is disposed on the protective layer 122. In an exemplary embodiment, the pixel electrode 130 includes a transparent conductive material, such as indium tin oxide ("ITO"), indium zinc oxide ("IZO"), etc.

The second display substrate 200 includes a second base substrate 210, a black matrix 220, a color filter layer 230, an overcoating layer 240, and a common electrode 250. A first opening pattern 251 may be defined in the common electrode 250.

In an exemplary embodiment, the second base substrate 210 includes a transparent insulating material, such as glass. The black matrix 220 is disposed in a non-effective area NA of the second base substrate 210 and the color filter layer 230 is disposed in an effective area EA of the second base substrate 210. In an exemplary embodiment, the color filter layer 230 includes the red, green, and blue color pixels R, G, and B, for example, and the black matrix 220 is disposed between the red, green, and blue color pixels R, G, and B. However, the invention is not limited thereto, and the color filter layer 230 includes may include various other color pixels. As shown in FIG. 1, each of the color pixels may be partially overlapped with adjacent black matrix 220 thereto.

A step difference occurs between the black matrix 220 and the color filter layer 230. The overcoating layer 240 has a predetermined thickness and is disposed on the black matrix 220 and the color filter layer 230 to reduce the step difference between the black matrix 220 and the color filter layer 230. The common electrode 250 is disposed on the overcoating layer 240 and has a uniform thickness. In an exemplary embodiment, the common electrode 250 includes the same material as the pixel electrode 130, e.g., ITO, IZO, etc.

The LCD apparatus 400 further includes a first spacer 261 and a second spacer 262 which are disposed between the first and second display substrates 100 and 200. The first and second spacers 261 and 262 are disposed on one of the first and second display substrates 100 and 200. In the illustrated exemplary embodiment, the first and second spacers 261 and 262 may be disposed on the second display substrate 200.

The first and second spacers 261 and 262 are provided to correspond to the non-effective area NA of the LCD apparatus 400 such that the first and second spacers 261 and 262 do not exert influence on the aperture ratio of the LCD apparatus 400. Although not shown in figures, in an exemplary embodiment, the first and second spacers 261 and 262 have a circular shape when viewed in a plan view and are arranged in a dot shape along the gate line GL and the data line.

The first spacer 261 makes contact with the first display substrate 100 to allow the first and second display substrates 100 and 200 to be spaced apart from each other by a predetermined reference distance (hereinafter, also referred to as a reference cell gap). The second spacer 262 has a height smaller than that of the first spacer 261. When no external force is applied to the LCD apparatus 400, the first spacer 261 disposed on the second display substrate 200 makes contact with the first display substrate 100 and the second spacer 262 disposed on the second display substrate 200 does not make contact with the first display substrate 100. A height of a spacer may be defined as a maximum length dimension of the spacer, or a distance from a reference surface (or element) to a distal end of the spacer.

Since the first spacer 261 includes a material having elasticity, the height of the first spacer 261 is reduced when the external force is applied thereto, and thus the cell gap between the first and second display substrates 100 and 200 is temporarily reduced by the elasticity of the first spacer 261. Then, when the external force disappears, the first and second display substrates 100 and 200 return to their original positions by a restoring force of the first spacer 261.

However, when the external force is greater than the elastic force of the first spacer 261, the cell gap between the first and second display substrates 100 and 200 is not restored to the reference cell gap. As a result, the cell gap of the LCD apparatus 400 is not uniformly maintained. The second spacer 262 absorbs the external force applied to the first spacer 261 and prevents the elasticity of the first spacer 261 from being damaged by the external force.

As shown in FIG. 1, a space that accommodates the liquid crystal layer 300 is defined between the first and second display substrates 100 and 200 by the first and second spacers 261 and 262.

When each of the first and second display substrates 100 and 200 is manufactured, liquid crystals are dropped on one of the first and second display substrates 100 and 200. Then, the first display substrate 100 is coupled to the second display substrate 200 while facing the second display substrate 200. Accordingly, the LCD apparatus 400 configured to include the first display substrate 100, the second display substrate 200, and the liquid crystal layer 300 interposed between the first and second display substrates 100 and 200 is completed.

Although not shown in FIG. 1, since the LCD apparatus 400 includes the liquid crystal layer 300 that is not a self-emissive device, the LCD apparatus 400 further includes a backlight assembly disposed at a rear side of the first display substrate 100 to generate the light. Therefore, the LCD apparatus 400 displays the image using the light generated from the backlight assembly and passing through the liquid crystal layer 300.

The pixel electrode 130 is disposed in the effective display area EA and the transmittance of the light passing through the liquid crystal layer 300 is controlled by the electric field generated between the pixel electrode 130 and the common electrode 250 in the effective area EA. The gate line GL, the data line, and the TFT are disposed in the non-effective area NA and the transmittance of the light is not controlled in the non-effective area NA. Thus, the light passing through the non-effective area NA, in which the transmittance thereof is not controlled, is blocked by the black matrix 220 to prevent the light from exiting from the LCD apparatus 400.

FIG. 1 shows the LCD apparatus 400 as an exemplary embodiment, but the above-mentioned structure should not be limited to the LCD apparatus 400 and may be applied to other various display apparatus such as an organic electroluminescent display apparatus, for example.

Figure 2A:
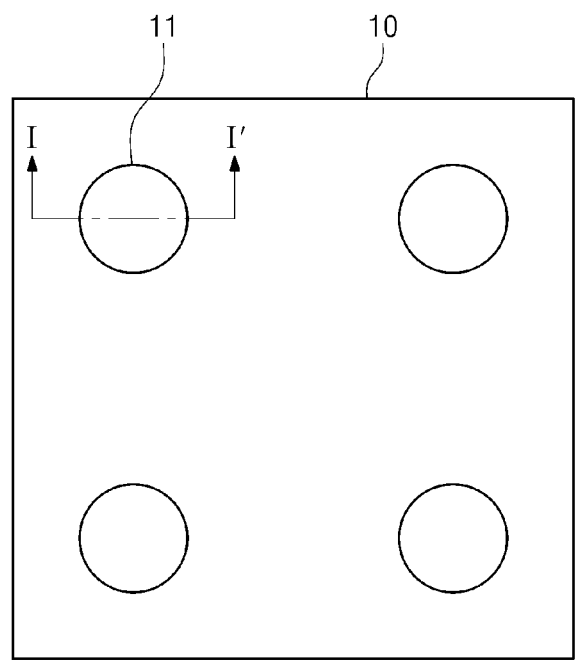
FIGS. 2A to 2C are plan views showing variations in width and height of a pattern as a function of an interfacial energy of a lower layer.
Figure 2B:
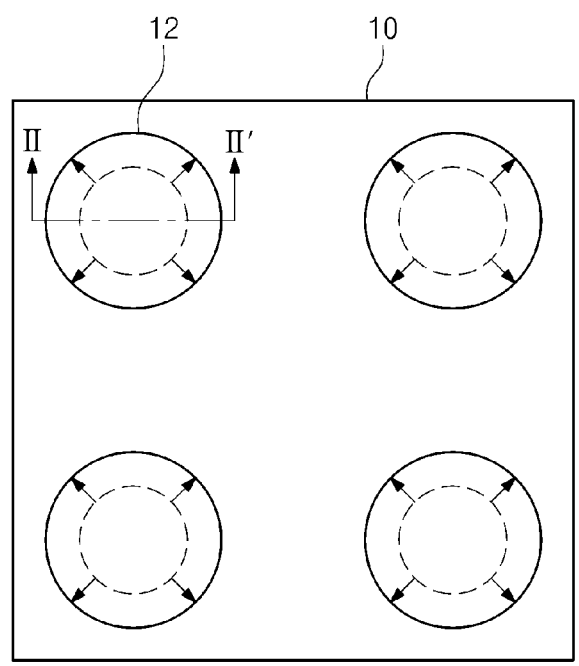
Figure 2C:
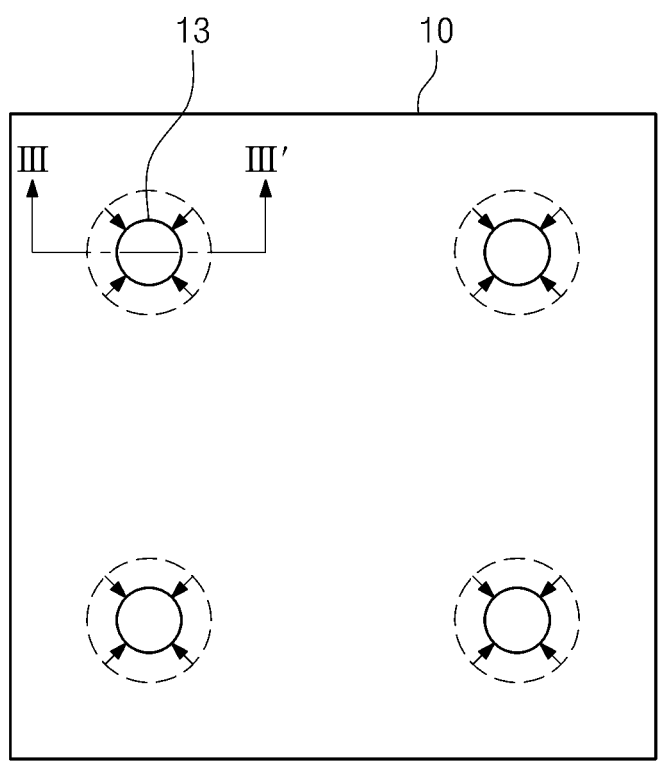
Figure 3A:
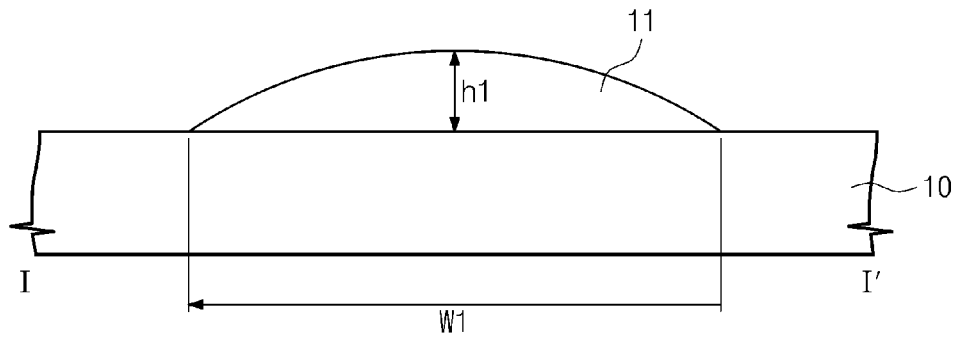
FIGS. 3A to 3C are cross-sectional views respectively corresponding to the plan views shown in FIGS. 2A to 2C.
Figure 3B:
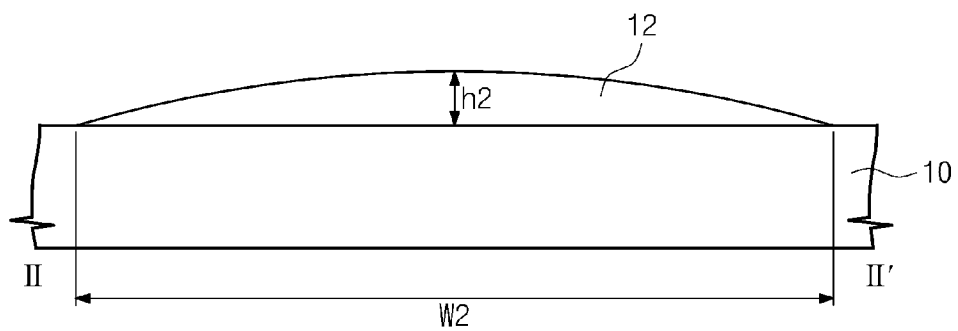
Figure 3C:
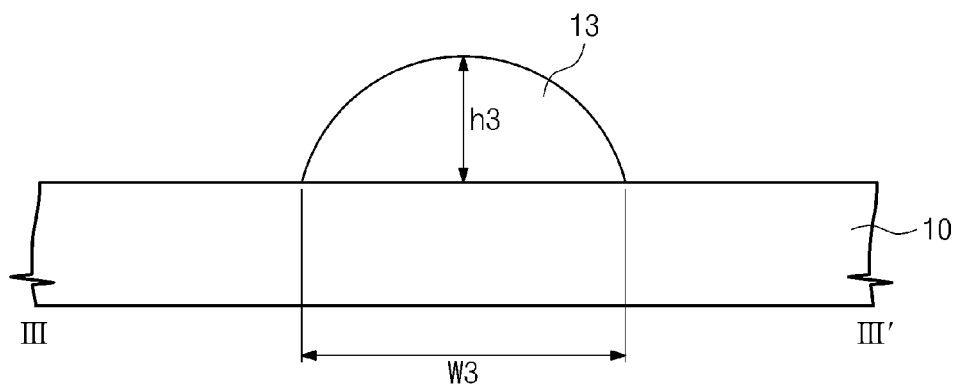

FIGS. 2A to 2C are plan views showing variations in width and height of a pattern as a function of an interfacial energy of a lower layer and FIGS. 3A to 3C are cross-sectional views respectively corresponding to the plan views shown in FIGS. 2A to 2C.

Referring to FIGS. 2A and 3A, an initial pattern 11 is disposed on the lower layer 10, e.g., a glass substrate. The initial pattern 11 has a first height h1 at a center portion along a vertical direction and a first width W1 along a horizontal direction in a cross section. When the initial pattern 11 is heat-treated at a temperature equal to or greater than a glass transition temperature during a few tens of seconds to a few thousands of seconds, a thermal reflow occurs and the size of the initial pattern 11 is varied.

The variation in the size of the initial pattern 11 becomes different depending on an aspect ratio of the initial pattern 11 and properties of the lower layer 10. In detail, when the first width W1 of the initial pattern 11 is about 30 micrometers (μm) and the first height h1 of the initial pattern 11 is about 3 μm, the aspect ratio of the initial pattern 11 is about 3 divided by 30, i.e., about 0.1. In the case that the aspect ratio is equal to or smaller than about 0.1, the variations in width and height of the initial pattern 11 do not occur even though the thermal reflow occurs after the heat treatment process. However, in the case that the aspect ratio is equal to or greater than about 0.2, the variations in width and height of the initial pattern 11 remarkably occur due to the thermal reflow after the heat treatment process.

In addition, the height of the initial pattern 11 increases or decreases after the thermal reflow depending on whether the lower layer 10 has hydrophilicity or hydrophobicity.

Referring to FIGS. 2B and 3B, when the lower layer 10 has the hydrophilicity, the initial pattern 11 is changed to a first pattern 12 having a second height h2 smaller than the first height h1 and a second width W2 greater than the first width W1.

Referring to FIGS. 2C and 3C, when the lower layer 10 has the hydrophobicity, the initial pattern 11 is changed to a second pattern 13 having a third height h3 greater than the first height h1 and a third width W3 smaller than the first width W1.

The width (y) of the first and second patterns 12 and 13 satisfies the following Equation 1.

$$y(\text{width}) = \sqrt{\dfrac{4\sin^2\theta}{\dfrac{\Pi}{180°}\theta - \cos\theta\sin\theta}} \cdot \sqrt{\chi\text{aspect}} \qquad \text{Equation 1}$$

In Equation 1, "θ" denotes a surface contact angle of the lower layer 10 with respect to a water drop and "χaspect" denotes the aspect ratio of the initial pattern 11.

In the case that the aspect ratio is constant and the lower layer 10 has the hydrophilicity, the surface contact angle is decreased to a first angle θ1. Accordingly, the width y(width) becomes greater than the first width W1 of the initial pattern 11 and the height becomes smaller than the first height h1 of the initial pattern 11.

In addition, in the case that the aspect ratio is constant and the lower layer 10 has the hydrophobicity, the surface contact angle is increased to a second angle θ2. Accordingly, the width y(width) becomes smaller than the first width W1 of the initial pattern 11 and the height becomes greater than the first height h1 of the initial pattern 11. As an exemplary embodiment, a difference between the surface contact angle θ2 of the lower layer 10 having the hydrophobicity and the surface contact angle θ1 of the lower layer 10 having the hydrophilicity is equal to or greater than about 5 degrees, e.g., about 40 degrees to about 60 degrees.

As described above, when the difference in properties of the lower layer 10 exists, the initial pattern 11 may be changed to the first and second patterns 12 and 13 having different sizes through the heat treatment process.

Figure 4:
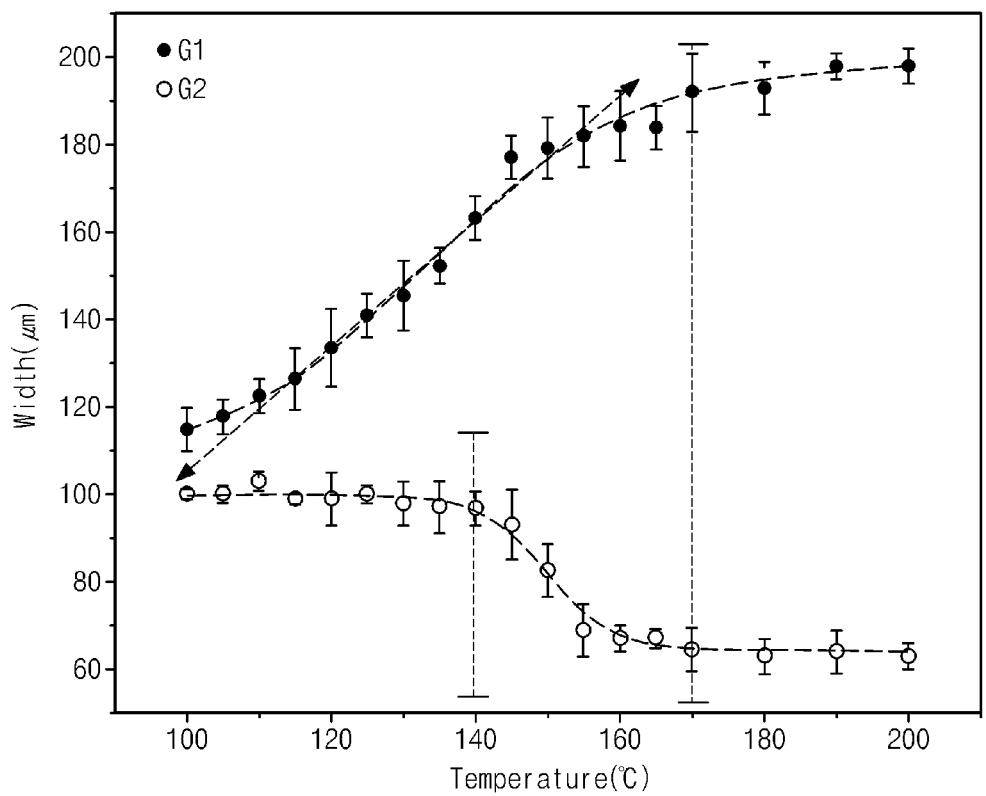
FIG. 4 is a graph showing a variation in a width of the pattern measured in micrometers as a function of a temperature in heat treatment measured in degrees Celsius.

FIG. 4 is a graph showing the variation in a width of the pattern measured in a micrometers (μm) as a function of the temperature in heat treatment process measured in degrees Celsius (° C.). In FIG. 4, a first graph G1 represents the variation in the pattern when the lower layer 10 has the hydrophilicity and a second graph G2 represents the variation in the pattern when the lower layer 10 has the hydrophobicity.

The difference in size between the first and second patterns 12 and 13 may be varied depending on the temperature of the heat treatment process. That is, when the lower layer 10 has the hydrophilicity, the width of the initial pattern 11 gradually increases while the temperature of the heat treatment process is in a range from about 100° C. to about 170° C. On the contrary, when the lower layer 10 has the hydrophobicity, the width of the initial pattern 11 is uniformly maintained while the temperature of the heat treatment process is in a range from about 100° C. to about 140° C. and gradually decreases while the temperature of the heat treatment process is in a range from about 140° C. to about 170° C. In addition, the width of the initial pattern 11 is uniformly maintained without being varied when the temperature of the heat treatment process becomes greater than about 170° C.

FIG. 4 only shows the variations in width of the initial pattern 11 according to the temperature of the heat treatment process, but the height of the initial pattern 11 has characteristic opposite to that of the width of the initial pattern 11.

When the difference in height between the first and second spacers 261 and 262 is predetermined, the temperature of the heat treatment process, the aspect ratio of the initial pattern 11, and the surface contact angle θ may be controlled to allow the first and second spacers 261 and 262 to have the predetermined height difference therebetween.

Figure 5A:
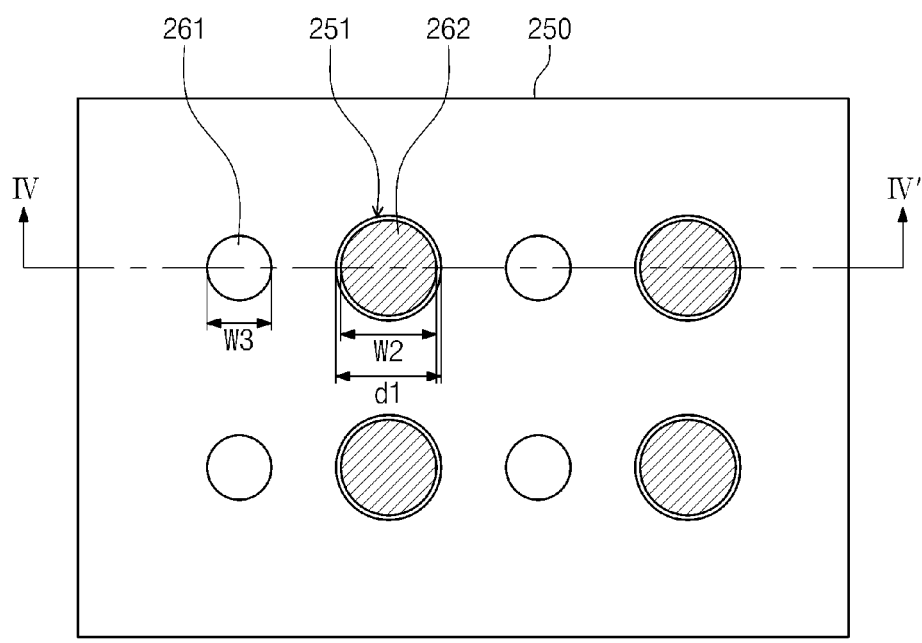
FIG. 5A is a plan view showing a second display substrate shown in FIG. 1.
Figure 5B:
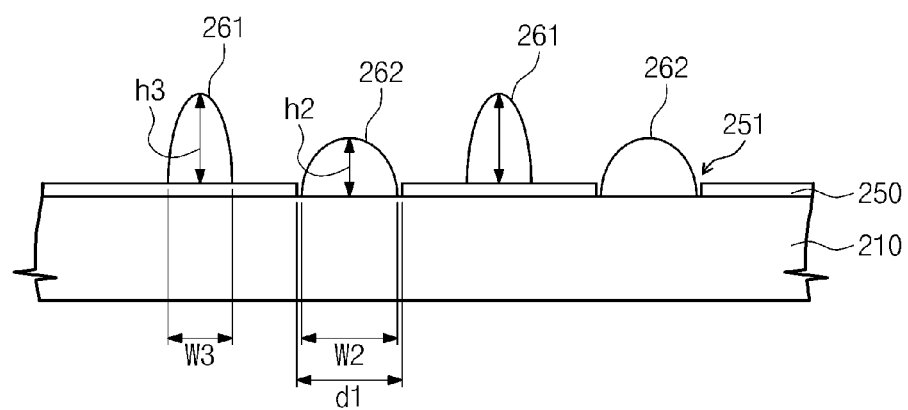
FIG. 5B is a cross-sectional view taken along a line IV-IV' shown in FIG. 5A.

FIG. 5A is a plan view showing the second display substrate shown in FIG. 1 and FIG. 5B is a cross-sectional view taken along a line IV-IV' shown in FIG. 5A.

Referring to FIGS. 5A and 5B, an uppermost layer of the second display substrate 200 is defined by the common electrode 250. For the convenience of explanation, layers disposed between the second base substrate 210 and the common electrode 250 are omitted in FIG. 5B.

The first and second spacers 261 and 262 are disposed on the second display substrate 200. In detail, the common electrode 250 is integrally provided as a single unitary and individual unit over the entire surface of the second display substrate 200. As an exemplary embodiment, a first opening pattern 251 is defined through the common electrode 250 to correspond to the area in which the second spacer 262 is provided and has a circular shape.

In the illustrated exemplary embodiment, the first opening pattern 251 has the circular shape when viewed in a plan view, for example, but it should not be limited to the circular shape. That is, in other exemplary embodiments, the first opening pattern 251 may have various other shapes, such as an oval shape, a rectangular shape, a diamond shape, etc.

A surface exposed through the first opening pattern 251 may be a surface of the second base substrate 210 or a surface of the overcoating layer 240 as shown in FIG. 1.

Since the second base substrate 210 includes a glass material and the overcoating layer 240 includes an organic insulating material, the second base substrate 210 and the overcoating layer 240 have a surface contact angle θ smaller than that of ITO or IZO used to form the common electrode 250. That is, the second base substrate 210 and the overcoating layer 240 have hydrophilicity greater than that of the common electrode 250.

The first opening pattern 251 has a diameter d1 greater than the width of the second spacer 262. According to another embodiment, however, the diameter d1 of the first opening pattern 251 may be equal to or smaller than the width of the second spacer 262.

The width W2 of the second spacer is greater than the width W3 of the first spacer 261 and the height h2 of the second spacer 262 is smaller than the height h3 of the first spacer 261.

The processes of providing the first and second spacers 261 and 262 will be described in detail with reference to FIGS. 9A to 10D later.

Figure 6:
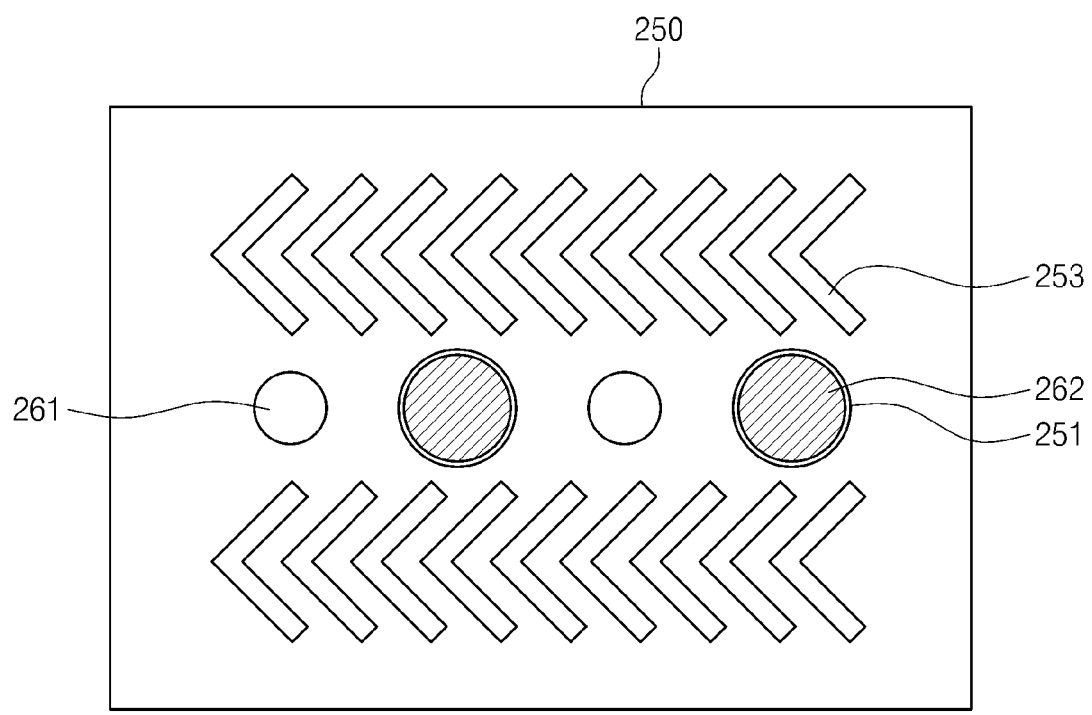
FIG. 6 is a plan view showing another exemplary embodiment of a second display substrate according to the invention.

FIG. 6 is a plan view showing a second display substrate according to another exemplary embodiment of the invention.

Referring to FIG. 6, an uppermost layer of the second display substrate 200 is defined by the common electrode 250. In a case that the LCD apparatus 400 employs the liquid crystal layer 300 including a vertically aligned liquid crystal, the common electrode 250 is patterned and a second opening pattern 253 is defined in the common electrode 250 to define domains in each pixel. When the common electrode 250 is patterned to define the second opening pattern 253 therein, the first opening pattern 251 having the circular shape may be defined to correspond to the area in which the second spacer 262 is provided.

That is, since the first and second opening patterns 251 and 253 are substantially simultaneously defined in the vertical alignment mode LCD apparatus 400, no additional mask process is required to form the first opening pattern 251.

Figure 7:
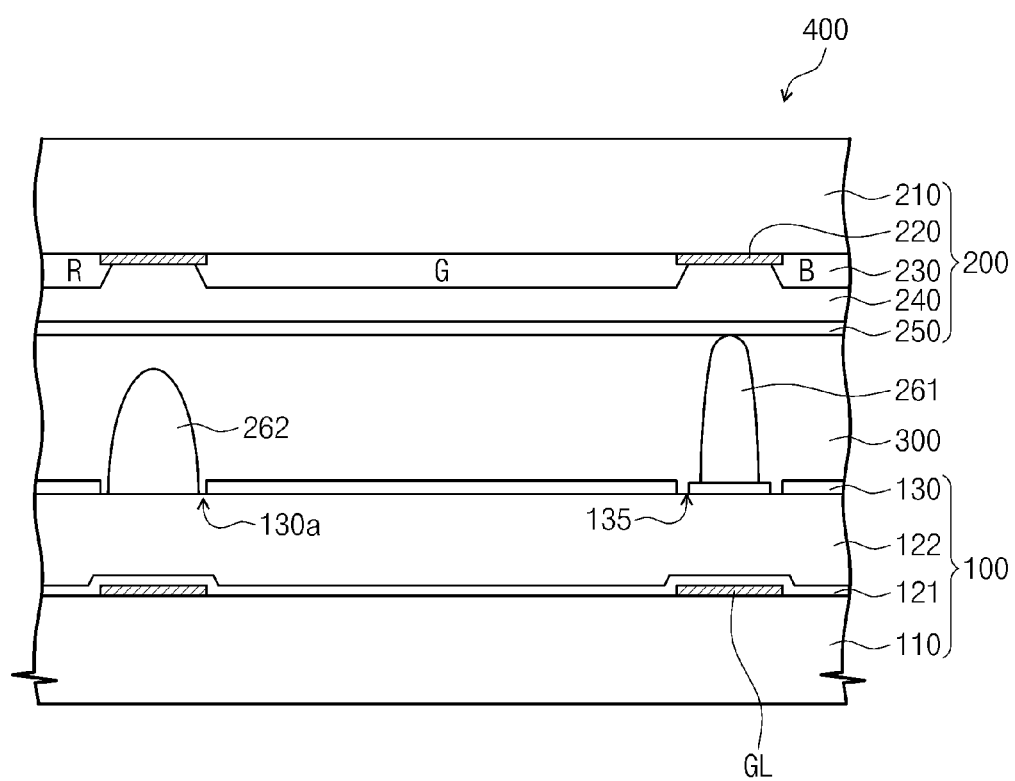
FIG. 7 is a cross-sectional view showing another exemplary embodiment of an LCD apparatus according to the invention.
Figure 8:
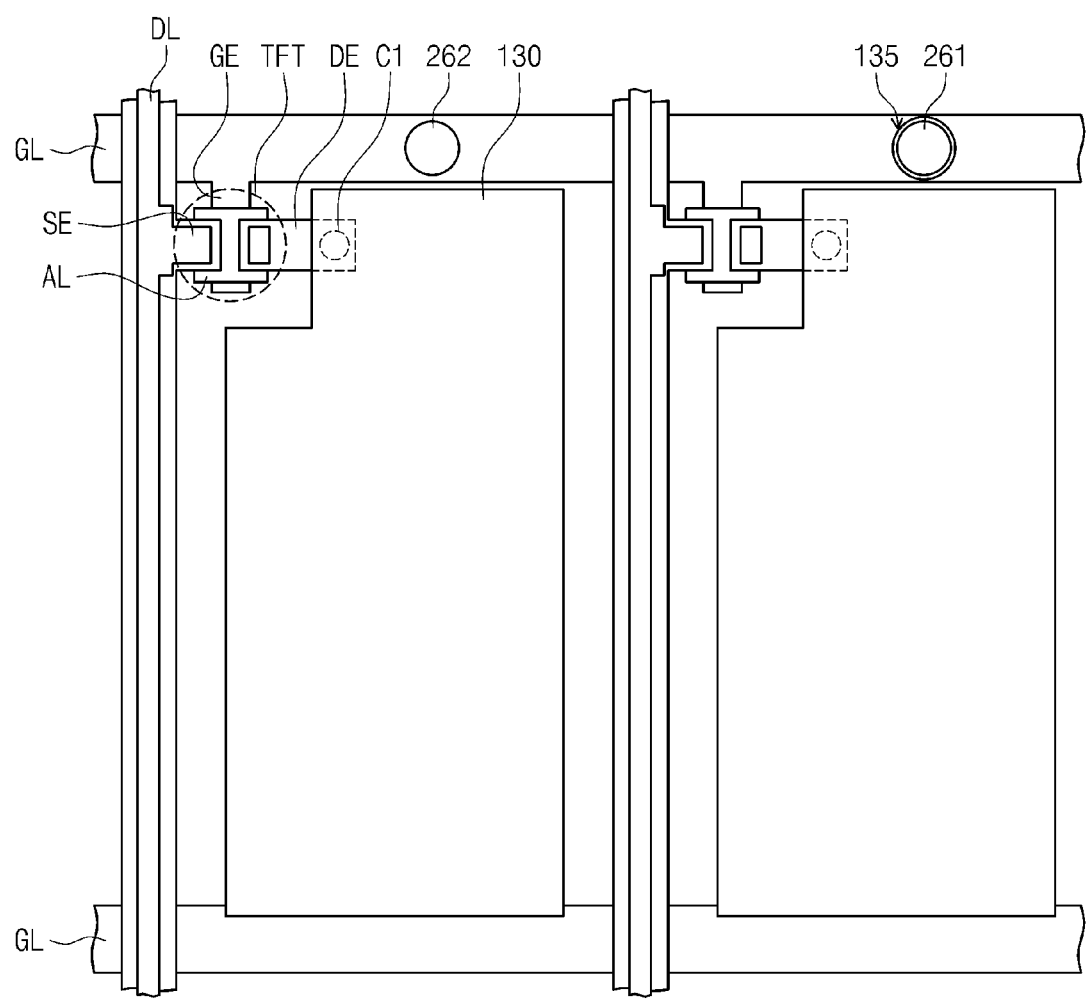
FIG. 8 is a plan view showing a first display substrate shown in FIG. 7.

FIG. 7 is a cross-sectional view showing an LCD apparatus according to another exemplary embodiment of the invention and FIG. 8 is a plan view showing a first display substrate shown in FIG. 7. In FIG. 7, the same reference numerals denote the same elements in FIG. 1, and thus detailed descriptions of the same elements will be omitted.

Referring to FIGS. 7 and 8, the first and second spacers 261 and 262 are disposed between the first and second display substrates 100 and 200. The first and second spacers 261 and 262 are disposed on one of the first and second display substrates 100 and 200. In the illustrated exemplary embodiment, the first and second spacers 261 and 262 are disposed on the first display substrate 100.

The first spacer 261 is disposed on the first display substrate 100 and makes contact with the second display substrate 200 to separate distance between the first and second display substrates 100 and 200 by the reference cell gap. The second spacer 262 is disposed on the first display substrate 100 and has the height smaller than that of the first spacer 261. When no external force is applied to the LCD apparatus 400, the first spacer 261 disposed on the first display substrate 100 makes contact with the second display substrate 200 and the second spacer 262 does not make contact with the second display substrate 200.

As shown in FIG. 8, the first and second spacers 261 and 262 are disposed in the area, in which the gate line GL is disposed, and arranged in the direction in which the gate line GL extends.

In an exemplary embodiment, the first display substrate 100 includes a plurality of pixel areas defined by the gate line GL and the data line DL and each pixel area includes the TFT and the pixel electrode 130. However, the invention is not limited thereto, and a plurality of pixel areas may not be defined by the gate line GL and the data line DL. The TFT includes a gate electrode GE connected to the gate line GL, an active layer AL, a source electrode SE connected to the data line DL, and a drain electrode DE connected to the pixel electrode 130. The pixel electrode 130 makes directly contact with the drain electrode DE through a contact hole C1 defined through the protective layer 122.

As an exemplary embodiment, a dummy electrode 135 is further disposed on the gate line GL and electrically insulated from the pixel electrode 130. In an exemplary embodiment, the dummy electrode 135 includes the same transparent conductive material, e.g., ITO, IZO, etc., with that of the pixel electrode 130 and is substantially simultaneously provided with the pixel electrode 130.

The first spacer 261 is disposed on the dummy electrode 135. In addition, the second spacer 262 is disposed on the protective layer 122 in an area 130a between two pixel electrodes 130 adjacent to each other. In an exemplary embodiment, the dummy electrode 135 includes ITO or IZO, and the protective layer 122 includes the organic insulating material, and thus the dummy electrode 135 has hydrophobicity to have the surface contact angle greater than that of the protective layer 122.

In the illustrated exemplary embodiment, the first and second spacers 261 and 262 are arranged along the gate line GL, but the invention is not limited thereto, and the first and second spacers 261 and 262 are provided along the data line DL or disposed above the TFT.

FIGS. 9A to 9D are cross-sectional views showing processes of providing the first and second spacers shown in FIG. 1.

Figure 9A:
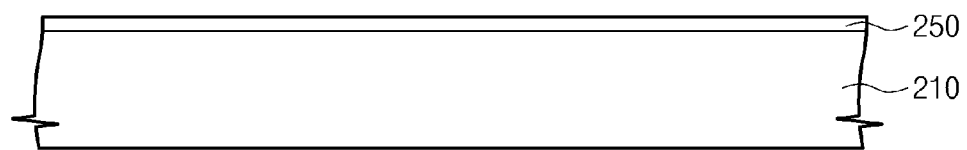
FIGS. 9A to 9D are cross-sectional views showing processes of providing first and second spacers shown in FIG. 1.

Referring to FIG. 9A, the common electrode 250 is disposed on the second base substrate 210. In an exemplary embodiment, the common electrode 250 includes ITO or IZO, for example. In an exemplary embodiment, the ITO has the surface contact angle of about 95° and the IZO has the surface contact angle of about 81°, for example.

Figure 9B:
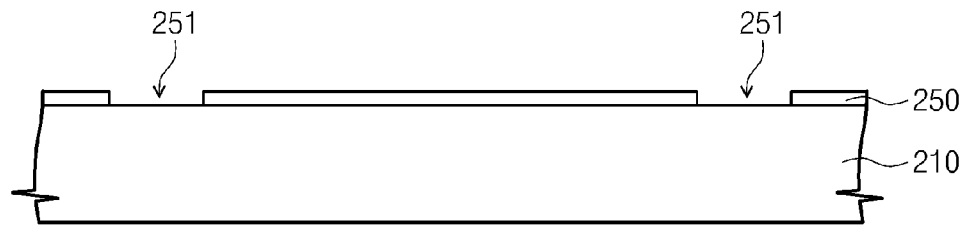

Referring to FIG. 9B, the common electrode 250 is patterned to define the first opening pattern 251 through a predetermined position of the common electrode 250. The first opening pattern 251 exposes the lower layer under the common electrode 250. In exemplary embodiments, the lower layer may be the surface of the second base substrate 210 or the surface of the overcoating layer 240 shown in FIG. 1.

In an exemplary embodiment, the second base substrate 210 includes the glass material and has the surface contact angle smaller than that of the ITO or the IZO, and the overcoating layer 240 includes the organic insulating material having the surface contact angle smaller than that of the ITO or the IZO, for example.

Figure 9C:
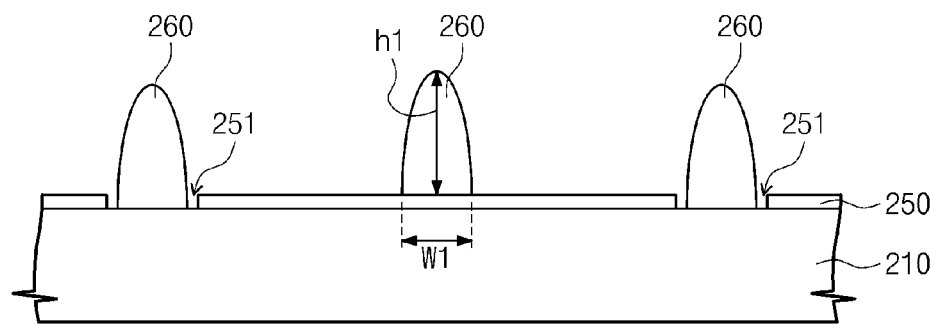

Referring to FIG. 9C, an initial spacer pattern 260 is disposed on the common electrode 250 and the second base substrate 210 through the first opening pattern 251.

The initial spacer pattern 260 has the first width W1 and the first height h1 and a ratio of the first height h1 to the first width W1, i.e., the aspect ratio, is equal to or greater than about 2.0.

Figure 9D:
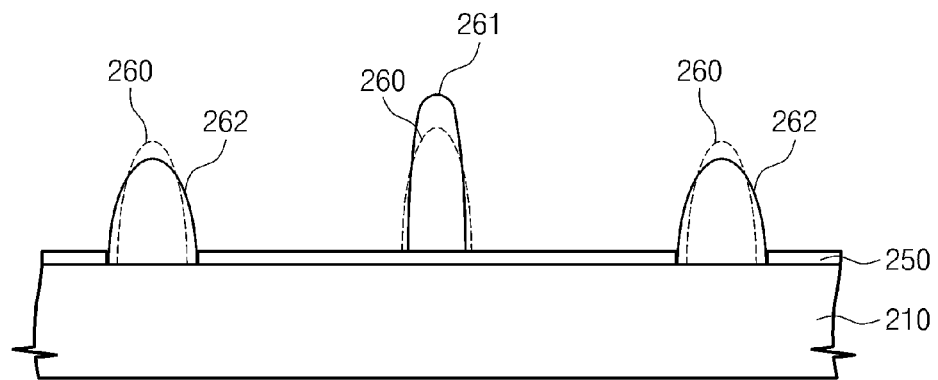

Referring to FIG. 9D, when the second display substrate 200 (refers to FIG. 1) on which the initial spacer pattern 260 is provided is heat-treated at the temperature equal to or greater than the glass transition temperature, the size of the initial spacer pattern 260 is varied according to the properties of the lower layer.

In detail, the initial spacer pattern 260 disposed on the common electrode 250 is changed to the first spacer 261 having the width smaller than that of the initial spacer pattern 260 and the height greater than that of the initial spacer pattern 260 since the common electrode 250 has a relative hydrophobicity.

The initial spacer pattern 260 disposed on the second base substrate 210 (or the overcoating layer 240) is changed to the second spacer 262 having the width greater than that of the initial spacer pattern 260 and the height smaller than that of the initial spacer pattern 260 since the second base substrate 210 (or the overcoating layer 240) has a relative hydrophilicity against the common electrode 250.

In FIGS. 9A to 9D, the first opening pattern 251 is defined through the common electrode 250 to allow the properties of the lower layers of the first and second spacers 261 and 262 to become different from each other. However, in a horizontal electric field mode LCD apparatus in which the common electrode 250 is disposed on the first display substrate 100 together with the pixel electrode 130, the second display substrate 200 may further include an inorganic insulating layer provided with an opening defined therethrough to correspond to the area in which the second spacer 262 is provided. In an exemplary embodiment, the inorganic insulating layer may include silicon nitride (SiNx), for example.

FIGS. 10A to 10D are cross-sectional views showing processes of providing the first and second spacers according to another exemplary embodiment of the invention.

Figure 10A:
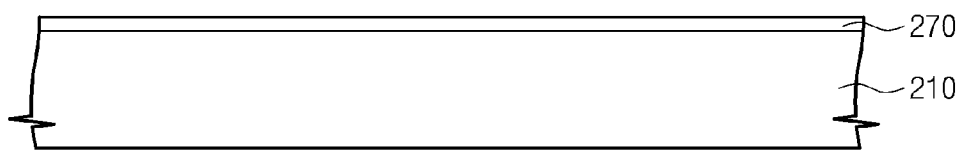
FIGS. 10A to 10D are cross-sectional views showing another exemplary embodiment of processes of providing first and second spacers according to the invention.

Referring to FIG. 10A, an inorganic insulating layer 270 is disposed on the second base substrate 210. In an exemplary embodiment, the inorganic insulating layer 270 includes silicon nitride (SiNx), for example.

Figure 10B:
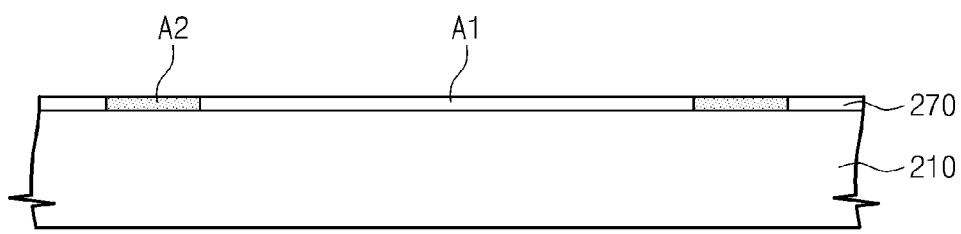

Referring to FIG. 10B, portions of the inorganic insulating layer 270 are surface-treated to define a first area A1 having a relative hydrophobicity and a second area A2 having a relative hydrophilicity. In an exemplary embodiment, the difference in contact angle against the water drop between the first and second areas A1 and A2 of the inorganic insulating layer 270 may be equal to or greater than about 5°, for example.

Figure 10C:
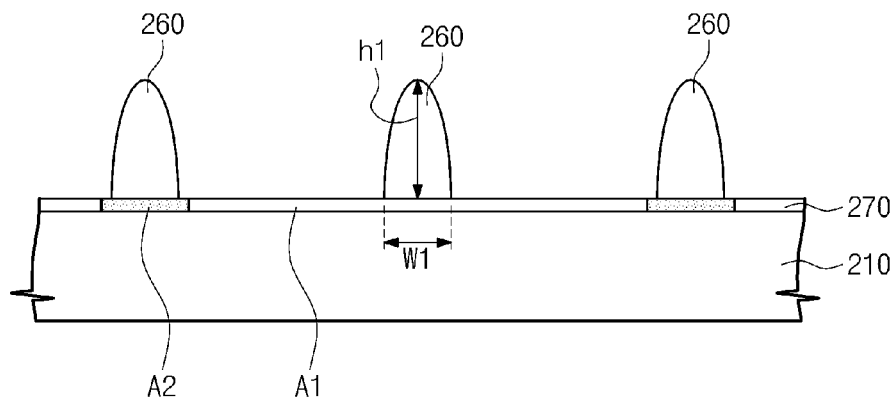

Referring to FIG. 10C, the initial spacer pattern 260 is disposed on the second area A2 and on a portion of the first area A1 of the inorganic insulating layer 270.

The initial spacer pattern 260 has the first width W1 and the first height h1 and the ratio of the first height h1 to the first width W1, i.e., the aspect ratio, may be equal to or greater than about 0.2.

Figure 10D:
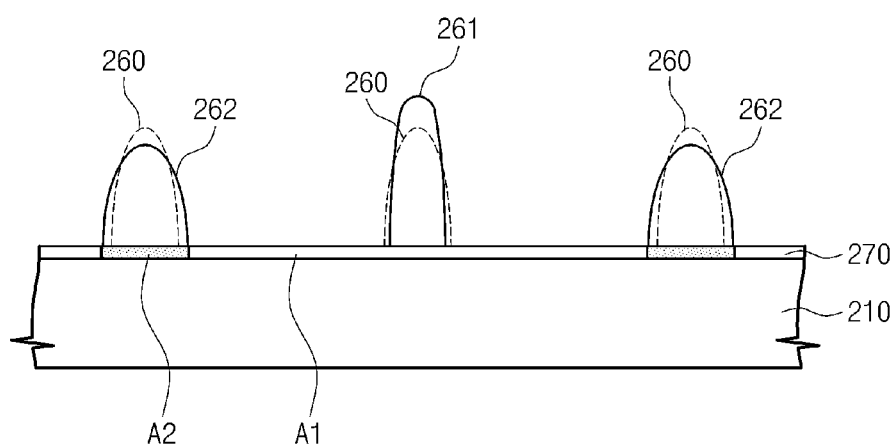

Referring to FIG. 10D, when the second display substrate 200 (refers to FIG. 1) on which the initial spacer pattern 260 is provided is heat-treated at the temperature equal to or greater than the glass transition temperature, the size of the initial spacer pattern 260 is varied according to the properties of the lower layer.

In detail, since the initial spacer pattern 260 disposed on the first area A1 has the relative hydrophobicity, the initial spacer pattern 260 is changed to the first spacer 261 having the width smaller than that of the initial spacer pattern 260 and the height greater than that of the initial spacer pattern 260.

The initial spacer pattern 260 disposed on the second area A2 has the relative hydrophilicity, the initial spacer pattern 260 is changed to the second spacer 262 having the width greater than that of the initial spacer pattern 260 and the height smaller than that of the initial spacer pattern 260.

FIGS. 9A to 9D and 10A to 10D show the processes of providing the first and second spacers 261 and 262 on the second display substrate 200, but as shown in FIG. 7, the processes of providing the first and second spacers 261 and 262 on the first display substrate 100 are the same as the above-mentioned processes.

Although the exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A display apparatus comprising:
 a first display substrate;
 a second display substrate which faces the first display substrate and is coupled to the first display substrate;
 first and second spacers disposed on one of the first and second display substrates; and
 a transparent electrode disposed between the one of the first and second display substrates and the first spacer, wherein a first opening pattern is defined through the transparent electrode, and the second spacer is disposed in the first opening pattern.

2. The display apparatus of claim 1, wherein the first spacer has a height different from a height of the second spacer.

3. The display apparatus of claim 1, further comprising a hydrophilic layer which has a hydrophilicity greater than that of the transparent electrode and is disposed between the one of the first and second display substrates and the second spacer.

4. The display apparatus of claim 3, wherein the first spacer has a surface contact angle greater than a surface contact angle of the second spacer.

5. The display apparatus of claim 4, wherein the surface contact angle of the first spacer is greater than the surface contact angle of the second spacer by about 5 degrees.

6. The display apparatus of claim 1, wherein a second opening pattern is defined through the transparent electrode and corresponds to a pixel electrode.

7. The display apparatus of claim 1, wherein the first opening pattern has a circular shape, an oval shape, a rectangular shape, or a diamond shape when viewed in a plan view.

8. The display apparatus of claim 7, wherein the first opening pattern has a diameter greater than a width of the second spacer when viewed in the plan view.

9. The display apparatus of claim 7, wherein the first opening pattern has a diameter equal to or greater than a width of the second spacer when viewed in the plan view.

10. The display apparatus of claim 1, wherein the transparent electrode is disposed only between the one of the first and second display substrates and the first spacer.

11. The display apparatus of claim 10, wherein the transparent electrode has a circular shape, an oval shape, a rectangular shape, or a diamond shape when viewed in a plan view.

12. The display apparatus of claim 10, wherein the transparent electrode has a diameter greater than a width of the first spacer.

13. The display apparatus of claim 10, wherein the transparent electrode has a diameter smaller than a width of the first spacer.

14. A method of manufacturing a display apparatus, comprising:
providing a first display substrate;
providing a second display substrate;
disposing first and second spacers on one of the first and second display substrates, the first spacer has a height different from a height of the second spacer;
providing a transparent electrode disposed between the one of the first and second display substrates and the first spacer; and
coupling the first display substrate and the second display substrate such that the first and second spacers are disposed between the first and second display substrates,
wherein the disposing the first and second spacers on the one of the first and second display substrates comprises: defining an opening pattern through a portion of an uppermost layer of the one of the first and second display substrates, which corresponds to an area in which the second spacer is disposed; providing an initial spacer pattern on the uppermost layer and on the area in which the opening pattern is defined; and heat-treating the initial spacer pattern at a temperature equal to or greater than a glass transition temperature to form the first and second spacers.

15. The method of claim 14, wherein the initial spacer pattern comprises a photosensitive material.

16. The method of claim 14, wherein the initial spacer pattern has an aspect ratio equal to or greater than about 0.2.

17. The method of claim 14, further comprising providing a hydrophilic layer having a hydrophilicity greater than that of the transparent electrode between the one display substrate and the second spacer.

18. The method of claim 17, wherein the first spacer has a surface contact angle greater than a surface contact angle of the second spacer.

* * * * *